Patented May 30, 1944

2,350,292

UNITED STATES PATENT OFFICE 2,350,292

COATED SHEET AND METHOD OF PRODUCING THE SAME

John P. Sermattei, Minneapolis, and Cecil M. Rhodes, St. Paul, Minn., assignors to Rapinwax Paper Company, Minneapolis, Minn., a corporation of Minnesota No Drawing. Application February 20, 1941, Serial No. 379,843

17 Claims. (Cl. 117—66)

This invention relates to coated sheets and methods of producing the same, wherein it is desired to provide a sheet which is moistureproof and heat sealable.

The prior art contains numerous patents disclosing moisture-proofing compositions coated upon paper, regenerated cellulose, and other sheet materials; some of these compositions are also heat-sealing and some are not. These prior art compositions are characterized by the use of a minor proportion of paraffin wax with various film forming materials, all of which are dissolved in suitable mixtures of organic solvents to produce coating lacquers which are applied to the paper and dried at an elevated temperature.

Thus, U. S. Patent 1,737,187 discloses a moisture-proofing composition, which, in its preferred embodiment, comprises nitro-cellulose, a gum or resin, a plasticizer, a minor proportion of paraffin wax, all of these ingredients being dissolved in a suitable mixture of organic solvents. This composition, when applied to a suitable base, such as a sheet of regenerated cellulose, and the solvents completely evaporated at an elevated temperature, gives a coating which is moistureproof and transparent but not heat-sealable. In order to seal a sheet coated with this composition to itself, solvents such as acetone or methyl "Cellosolve" or special adhesives must be employed.

More recently, U. S. Patent 1,997,583 has appeared, and this discloses a coating composition comprising 10 parts of a well plasticizable pyroxylin having a nitrogen content of 10.5%–11.4%, 5–8 parts of a solvent plasticizer, which is a good plasticizer for the pyroxylin, 0.1–1.0 part of paraffin wax and preferably 1–2 parts of a blending agent, all these ingredients being dissolved in a suitable solvent mixture. When this composition is applied to a suitable base such as regenerated cellulose and the solvents completely evaporated at an elevated temperature, it is claimed that a coating is obtained which is moistureproof and transparent and also heat-sealable. That is, a sheet coated with this composition can be sealed to itself by the simple application of heat and pressure, to give a bond that is as strong or stronger than that obtained by the use of solvents such as acetone or methyl "Cellosolve."

The compositions of both these patents are characterized by the use of a minor amount of a waxy ingredient to obtain moistureproofness and in both cases this wax is preferably paraffin. U. S. Patent 1,737,187 gives 2–6% of the solids as the preferred range of wax contents, and 10% as the upper limit, above which crystallization of the wax begins resulting in a film of reduced transparency. U. S. Patent 1,997,583 recommends the use of 0.1–1.0 part of wax to 10 parts of the nitro cellulose, which is equivalent to 0.5%–6.0% was expressed as a percentage of the total solid ingredients. Both the above patents are further characterized by the use of nitrocellulose as the preferred film forming or base material, and by the use of plasticizers which are essential for good moistureproofness in the compositions of U. S. Patent 1,737,187, and for both the moistureproofing and heat sealing properties in the compositions of U. S. Patent 1,997,583.

The compositions used in the methods and on the articles of the instant invention differ from those compared to the compositions of U. S. Patent 1,737,187, the compositions of the instant invention are truly heat sealable, whereas those of the above patent are not. As compared to the compositions of U. S. Patent 1,997,583, which are heat sealable, the coated sheets of the instant invention seal more readily and over a wider temperature range to give generally stronger bonds. Moreover, coatings containing nitrocellulose frequently give trouble by scorching and discoloring, when the temperature employed for sealing exceeds the decomposition temperature of the nitrocellulose, as is frequently the case. The coating compositions used in the methods of the instant invention do not contain nitro-cellulose and are consequently free from this defect.

A most important difference from the prior art compositions, which contain only a minor quantity of wax, preferably not exceeding 6%, is the use in the compositions used in the methods and on the articles of this invention of a substantial amount of wax which is never less than 10% and may be as high as 75% in some cases, but is preferably in the range 20–60% of the total solids or film forming ingredients. In one of its aspects then, this invention consists in devising coating methods involving compositions which contain substantial amounts of wax and yet are highly transparent. Furthermore, these coatings used in our methods are glossy, hard, tough, flexible, non-tacky, non-blocking, non-smearing, of good surface slip, moistureproof, and heat sealable. By virtue of their high wax contents these compositions are glossier than those of the prior art and considerably more moistureproof. They are also more readily heat-sealable and better adapted for use on high speed automatic wrapping machines, such as are used, for example, in wrapping bread. Moreover, these advantages have been gained without any loss in transparency, surface slip, flexibility, toughness, resistance to smearing, resistance to blocking or any other desirable property.

A further important difference in the compositions used on the base sheets of the instant invention is the use of spermaceti as the preferred and primary moistureproofing agent. In some cases paraffin may be used, but paraffin is much less generally useful than spermaceti, for it fails to develop moistureproofness in the compositions of the present invention except in a few formulas which represent a narrow range of compositions. Spermaceti, on the other hand, develops good moistureproofness in a wide range of compositions, it develops a higher degree of moistureproofness than paraffin, and paraffin in general is not a substitute except in a few instances which are noted later in this disclosure. However, small amounts of paraffin, that is, 3–10% of the solids, can be used in addition to the spermaceti, in which case the moistureproofness is sometimes slightly enhanced and the surface slip improved. In these cases, though, the spermaceti remains the primary moistureproofing agent, for without the presence of spermaceti the paraffin alone would generally not confer moistureproofness as this term is defined later in this specification.

Another difference from the prior art compositions is that the compositions coated on base sheets as described in the instant invention contain no plasticizer and need none to develop their excellent moistureproofing and heat sealing properties.

A still further difference from prior art compositions is the use in our methods of cellulose ethers, such as benzyl or ethyl celluloses, as the preferred film forming or base materials. Because of their greater wax compatibility, the cellulose ethers particularly ethyl cellulose, are much superior, to nitro-cellulose in the high wax content compositions of the type here disclosed. Also because of the greater thermo-plasticity of ethyl cellulose, its compositions in general when applied on a base sheet are more readily heat sealable than those of nitrocellulose.

It is, therefore, an object of this invention to provide base sheets coated with coating compositions containing a cellulose ether and substantial amounts of wax which are highly moistureproof and heat sealable.

It is a further object of this invention to provide base sheets coated with coating compositions which contain a cellulose ether and substantial amounts of wax and yet are highly transparent.

A further object of this invention is to provide base sheets coated with coating compositions containing a cellulose ether and substantial amounts of wax which are transparent, glossy, hard, tough, flexible, non-tacky, non-blocking, non-smearing, of good surface slip, as well as being moistureproof and heat-sealable.

A still further object is to provide base sheets coated with coating compositions containing a cellulose ether and substantial amounts of wax which are glossier and more moistureproof than prior art compositions containing a minor amount of wax.

Another object is to provide base sheets coated with coating compositions containing a cellulose ether and substantial amounts of wax which are more easily heat-sealable to give generally stronger bonds than the prior art coatings, and are also better adapted for operation on the high speed automatic wrapping machines such as are used to wrap bread.

A still further object is to provide base sheets coated with coating compositions which, when applied to a glassine base, produce a moistureproof and heat-sealable sheet, which can be used to wrap a product of high moisture content, such as bread, without developing the buckling, loss of gloss, haziness, and sogginess, characteristic of a waxed glassine under these conditions of use, and to a lesser extent, characteristic also of a glassine coated on both sides with a moistureproofing nitrocellulose lacquer containing a minor quantity of wax.

Still another object is to provide methods that can be used to laminate paper, foil, chipboard, Cellophane, and other sheet materials, and produce a composite moistureproof product.

Other objects will appear from the following description and the appended claims.

For the purpose of this specification and claims, we define a moistureproof coating as one which, when applied to one side of a glassine paper at a coating weight not exceeding 2.5 lbs. of dry solids per ream (2880 sq. ft.), reduces the moisture vapor transmission to 500 grams or less at the relative humidity differential obtained by maintaining a relative humidity of 100% on the coated side of the sheet and a relative humidity of 15% on the uncoated side. Plain, uncoated glassine will transmit under these same conditions about 5500 grams of water vapor per 10,000 square inches per 24 hours. It will be understood that this definition represents a minimum moistureproof value; compositions, formulated according to the teachings of this invention, when applied to one side of a glassine paper, are capable in many cases of reducing the moisture vapor transmission value to 100, 50, 20, and even less grams of water per 10,000 square inches per 24 hours under the temperature and humidity conditions stated above. When a glassine paper is coated on both sides, the moisture loss value is ordinarily about one half that obtained when one side only is coated, if the same composition at the same coating weight that is on the first side is applied to the second side.

The coating compositions used in the methods of this invention are also truly heat sealable, and for the purpose of this specification and claims, we define this as follows:

By heat sealable, we mean that two strips of coated glassine paper, 2 inches in width, having a coating weight not exceeding 2.5 lbs. of dry solids (i. e. non-volatile coating materials) per side per ream (2880 sq. ft.), and sealed together by the application of heat and pressure in the manner described below, will require a force of at least 20 grams to pull them apart, when the end of one strip is attached to a device which indicates the pull, and the same end of the other strip is held in the hand and slowly drawn away until the bond is ruptured. The reading of the instrument for recording the pull is recorded at this point, and the test repeated a number of times in order to get a good average value. For the purposes of this test, the seal is made by superposing the two strips of coated paper upon each other so that the coated sides come together, placing them upon a smooth brass cylinder heated to a temperature between 200 degrees F. and 450 degrees F., usually about 300 degrees F., and pressing them together over the cylinder on top of the paper strips to be sealed. The weight of the felt strip is 200 grams and the time of contact with the heated brass cylinder is 3 seconds. In this way, seals are made under conditions where temperature, pressure, and time of contact are all under control. It will be understood that the value 20 grams represents a minimum sealing strength value; coating compositions formulated in accordance with the teachings of this invention in many cases give seals withstanding 50, 100, 150, 200 grams and even greater pulls on a strip 2 inches wide. In some cases the strength of the bond is greater than that of the paper, and the paper tears before the bond between the strips gives way. The sealing strength obtained with any given coating composition in this test depends to some extent upon the plasticizer and moisture content of the glassine paper; a soft, well humidified sheet gives generally higher values than a paper that is low in plasticizer and moisture content. The values given above refer to results obtained on a well plasticized sheet of glassine, having a sufficient moisture content for commercial wrapping purposes, this moisture content being in the range 3.5–8%.

The coating compositions of this invention are compounded by dissolving a cellulose ether, which is preferably ethyl cellulose, a moistureproofing wax, which is preferably spermaceti, and preferably a hard wax or resin, or both a hard wax and resin, in a suitable mixture of organic solvents, heated to a temperature at which all the ingredients are mutually soluble and are not absolutely essential, for compositions with good moistureproofing and heat sealing properties can be obtained with ethyl cellulose and spermaceti alone, hard wax or resin, or both hard wax and resin are also present. The hard wax and resin function as blending agents for the ethyl cellulose and spermaceti alone, but the film clarity of these two component systems is not as good as when a hard wax or resin, or both hard wax and resin, are also present. The hard wax and resin function as blending agents for the ethyl cellulose and spermaceti, resulting in coatings of better gloss and transparency, as well as better properties generally. However, for purposes where only moistureproofness and heat-sealability are needed, and high gloss and transparency are of secondary importance, coatings comprising only ethyl cellulose and spermaceti are satisfactory.

The coating compositions are prepared simply by adding all the solid ingredients to the solvent mixture in a closed container, heating to a temperature of about 90–150 degrees F., and stirring until complete solution results. The slightly elevated temperature is necessary to completely dissolve the hard waxes, most of which are relatively insoluble at room temperature and tend to cloud the solution, or in some cases even cause gelation to occur, when the temperature drops below 70–120 degrees F., depending on the particular hard wax used in its concentration in the solution.

These coating solutions must, therefore, be held at a temperature above the cloud or gelation points during the coating operation; in most cases a temperature of 115 degrees F. has been found sufficiently high for this purpose, although in some cases where the hard wax is a particularly insoluble one, or its concentration in the solution unusually high, a somewhat higher coating temperature may be necessary. On the other hand, where no hard wax or paraffin is present, as is the case with compositions comprising ethyl cellulose and spermaceti, or ethyl cellulose, resin, and spermaceti, the coating solutions can be applied at room temperature without any clouding, gelation, or wax separation occurring. In general, it is desirable to keep the temperature of the coating solution as low as is compatible with a clear, flowable solution, in order to reduce solvent evaporation losses as much as possible. This can be accomplished also by keeping the pan containing the coating solution as completely enclosed as possible during the coating operation.

These coating solutions may be applied to paper, "Cellophane," or to other opaque or transparent sheet material by any suitable means such as: spraying, brushing, dipping, knife coating, or roller coating. Ordinarily, it will be found most convenient to apply these coatings by use of one of the various types of lacquer coating machines that are now on the market for this purpose. For best results, a machine is required that is capable of applying a precisely metered weight of lacquer to the web, and which is also provided with a suitable mechanism for smoothing the coating and eliminating any ridges or irregularities that may be present, before the wet lacquer film is dried. The machine should preferably have a lacquer pan that is as completely enclosed as possible, and provided with means for mildly heating the lacquer and maintaining its temperature constant. This machine must also be provided with suitable drying equipment for evaporating the lacquer solvents at an elevated temperature. This drier should be preferably of the drum drier type for the reason given below, but a hot air drying tunnel or tower may be also used and in some cases may be preferred. Moistening devices for humidifying the paper before coating, or a rehumidification chamber for rehumidifying after coating and drying, should also be provided, either as separate or integral units with the coating machine. Positively cooled chilling rolls for chilling the coating after drying are quite essential and should also be provided.

After the coating solution is applied to the paper, the solvents must be completely evaporated, and to do this speedily, and also to obtain a coating of high gloss and transparency, an elevated temperature must be employed. This temperature is preferably 80–115 degrees C. This drying is preferably done on drum drier heated to the desired temperature; this drum should be suitably enclosed and connected with a fan for exhausting the solvent vapors. When a drum drier is used, only one side of the sheet (the side away from the drum) can be coated and dried at one time. This is not objectionable, however, for in many cases, it is preferable to use coatings of different water-vapor permeabilities on the two sides, for reasons which are given later, and in this case naturally only one coating can be applied at a time. Applying the coating to one side at a time also makes it convenient to rehumidify the sheet by spraying a fine mist of water against the uncoated side between the first and second coating operations. Moreover, both the initial cost and operating costs of a drum drier are less than those of hot air tunnel or tower drier.

The chief reason for preferring to use a drum drier, however, is that the coatings of this invention develop considerably better moisture-proofness when dried in this way. The reason for this is not clear, but apparently the much faster drying, obtained by contact with a heated drum, causes the film to set with a different internal structure that possesses a higher degree of moistureproofness.

Since these coatings are thermo-plastic, the use of a drum drier might be thought to be unsuited, due to the possibility of sticking to the drum and of marring of the side coated first, during the drying of the second side. This is a real enough danger, but accidentally it was discovered that if the surface of the steel drum is rusted, so that an adherent rust coating covers its entire surface, sticking is entirely prevented, and this is accomplished without any material loss in drying efficiency. Whether this unexpected and surprising effect is due to some specific effect of the iron oxide surface or is simply due to the roughening action of the rusting is not known. If it is caused solely by the roughening action of the rust, then sand-blasting the drum surface or an equivalent treatment should be equally effective. As a further safeguard against the sticking of the first coated side to the drum, it is preferable to dry the second coating at a somewhat lower temperature than the first.

The drying time required will depend upon a number of factors, such as: the solvents employed and their percentage of the total coating solution, the coating weight applied to the base sheet, the type of base sheet, and surface temperature of the drying drum. In general, drying is very fast by this method, and subject to these factors, the drying time will vary from 1 to 10 seconds. In any case, drying should be continued until all trace of solvent odor is gone from the coated sheet.

A hot air drying tunnel or tower, through which a large volume of air heated to 80–115 degrees C. is circulated, can be also used to dry the coating lacquers of this invention, and with this equipment both sides of the base sheet can be coated and dried simultaneously, but in general the moistureproofness will not be as high as when the faster drum drying method is used. Drying is much slower by this method, and subject to the same factors given just above, the drying time will ordinarily vary from 15 seconds to 2 minutes.

After drying, the coating should be cooled to room temperature or below in order to reduce its plasticity before the sheet is wound up, or otherwise sticking in the rolls or "blocking" may occur. Cooling or chilling, preferably by contact with cold rolls, or optionally by water dipping, also has the desirable effect of enhancing the gloss and improving the transparency and also the moistureproofness in many cases. The exact rate of cooling needed to obtain the optimum effects on gloss and transparency as well as on moistureproofness will vary somewhat in individual cases. Some experimentation on this point may be required with specific compositions, but in general the coating compositions of this invention give the best results if they are allowed to air cool slightly below the drying temperature before the positive chilling of the cold rolls or of the cold water bath is applied. The temperature of the cold rolls or water bath is maintained in the range 40–60 degrees F. If a water dipping method of chilling is used it is, of course, necessary to immediately remove the surplus water by means of squeeze rolls, suction devices, scraping blades or the like. In a few instances, it may be found that air cooling alone without any further chilling will give as good results as when chilling is used, but generally speaking, some positive chilling following drying is desirable with the coating compositions of this invention.

The elevated temperature used to evaporate the solvents will also have the effect of reducing the moisture content of the paper, glassine, or "Cellophane" sheet, causing the sheet to become brittle unless this moisture content is replaced. This can be done by rehumidification following the coating and drying operations, or it can be accomplished equally as well, and sometimes more conveniently, by introducing a slight excess of water into the sheet prior to coating, to compensate for that which is driven off in the drying process.

This moistening prior to coating can be done in various ways. Most convenient perhaps is the use of spray nozzles, which produce a fine water mist and which can be adjusted to apply the requisite amount of moisture to the sheet. With a sheet such as glassine or "Cellophane," this moisture content must be held within rather close limits, to prevent, on the one hand, swelling and wrinkling of the sheet caused by excessive moisture, and on the other hand, brittleness caused by a deficient moisture content.

With glassine, for example, the optimum moisture content for good wrapping, folding, and heat sealing qualities is 4–6%. In order to achieve this moisture content in the finished, coated sheet, it is necessary to raise the moisture content, by spraying prior to coating, to about 7–9%. After the water spraying operation, it is preferable to wind the paper up, wrap it in waxed paper or store it in a closed metal container, and let the roll stand overnight or longer to allow the moisture to diffuse evenly through the sheet, before applying the lacquer coating.

If one side of the paper is coated at a time, which is in fact the only way the paper can be coated when the preferred method of drum drying is used, the moistening or water spraying operation can be most conveniently done between the coating of the first and second sides. If one side only of the paper is to be coated, as is sometimes the case, the moistening can be done after the coating operation by spraying the uncoated side.

When both sides of the sheet are coated simultaneously, and rehumidification following coating, rather than moistening prior to coating is employed, this should be done immediately after drying and before the cooling or chilling operation previously mentioned. This is accomplished by passing the sheet through a humidification chamber in which a temperature of 45–90 degrees C. and a relative humidity of 60–85% is maintained.

As has been stated, the coating lacquers of this invention comprise a cellulose ether and a moistureproofing wax which is preferably spermaceti, and preferably also a hard wax or resin, or both a hard wax and resin, all these ingredients being dissolved in a suitable mixture of organic solvents.

For the cellulose ether, we prefer to use ethyl cellulose although other cellulose ethers such as benzyl cellulose can also be employed. The ethyl cellulose is the commercially available grade which contains 2.4 to 2.5 ethoxy groups per glucose residue and possesses good compatibility with resins and waxes. Either the high, medium, low, or extra low viscosity grades can be used, but we prefer the low viscosity grade, since it combines good toughness and flexibility, with a sufficiently low viscosity to permit the coating of lacquers of quite high solids content. The low viscosity type is defined as having a viscosity of 24 to 28 centipoises when measured in a 5% solution in a solvent mixture of 80% toluene and 20% alcohol in a capillary viscometer at 25 degrees C.

For the moistureproofing wax, we prefer to use spermaceti, and for use in the coating compositions of this invention no entirely satisfactory substitute for this wax has been found. Paraffin is by no means a substitute for it does not develop moistureproofness in compositions comprising (A) ethyl cellulose and paraffin, (B) hard wax, ethyl cellulose, and paraffin, (C) hard wax, resin, ethyl cellulose and paraffin, whereas spermaceti develops good moistureproofness in all these cases. However, paraffin does work satisfactorily in certain compositions comprising resin, ethyl cellulose, and paraffin, and in this limited range of compositions it can be considered a substitute moistureproofing agent for spermaceti. Paraffin can be used, however, in addition to the spermaceti and in small amounts (3–10% of the solids) this is sometimes desirable, for it improves the surface slip and sometimes slightly enhances the moistureproofness. In these cases, however, spermaceti remains the primary moistureproofing agent, for in its absence, the paraffin alone would not develop any moistureproofness, except in the one case just noted of certain compositions comprising resin, ethyl cellulose, and paraffin. In addition to its moistureproofing properties, it should be noted that spermaceti also exerts a plasticizing effect, and definitely contributes to the heat sealability and flexibility of the final film.

For the hard wax, there are a number of waxes which give very satisfactory results; thus, we may use Opal Wax (a hydrogenated castor-oil manufactured by E. I. du Pont de Nemours & Co., Wilmington, Del.); Albacer Wax (a hydrogenated polyhydric alcohol ester of vegetable oils manufactured by Glyco Products Co., 148 Lafayette St., N. Y. C.); Glyco Wax B430 (a synthetic hydrocarbon ester wax manufactured by Glyco Products Co., 148 Lafayette St., N. Y. C. and Farbenindustries of Germany and distributed in the U. S. A. by the General Dyestuff Corp., N. Y. C.); I. G. Wax E (a condensation product of an aliphatic alcohol with purified montanic acid manufactured by the I. G. Farbenindustrie and distributed by General Dyestuff Corp.); and carnauba wax. Undoubtedly there are also other hard natural and synthetic waxes which can be used, although not all will develop high moistureproofness. Thus candellila wax is not very satisfactory for this reason.

For the resin, we prefer to use hydrogenated ester gum, because of its good stability against oxidation in the film, and also because of its good color and almost complete lack of odor. However, there are a number of other compatible resins that might be used, such as: ester gum, dewaxed damar, Nevillite (a cycloparaffine or naphthene polymer type of resin manufactured by the Neville Co., Pittsburgh, Pa.), Paranol 2924B (a phenol formaldehyde modified ester gum manufactured by the Paramet Chemical Co., Long Island City, N. Y.), Arolite 55 (a modified phenolic manufactured by the Stroock and Wittenberg Corp., N. Y. C.), Arolite 545 (a maleic anhydride ester gum condensate type of resin manufactured by Stroock and Wittenberg Corp., N. Y. C.), Teglar 15 (a modified alkyd type of resin manufactured by the American Cyanamid Co., N. Y. C.); in addition to these, there are undoubtedly many other resins of the above or other types that might be used.

In addition to these primary ingredients it is sometimes desirable to add small amounts of other materials to confer certain special properties. Thus, small percentages of finely divided powders of low hiding power, such as: talc, magnesium carbonate, calcium carbonate, calcium sulfate, aluminum hydrate, zinc stearate, aluminum stearate, calcium stearate, and Kadox (Kadox is a very small particle size zinc oxide of low hiding power manufactured by New Jersey Zinc Co.) can be used to improve slip, increase resistance to blocking, and improve the working properties on automatic wrapping machines. These materials are insoluble and remain suspended in the coating solution. Their amount must be carefully regulated, for if too much is used, the gloss and transparency are reduced. In small amounts, however, (1–5% of the solids) these materials in many cases effect a marked improvement in slip, resistance to blocking, and working properties on automatic wrapping machines, with only a very slight reduction in gloss and transparency. Of the materials named for this purpose, the metallic stearates and the small particle size zinc oxide have been found to give the best results.

Dyestuffs, coloring matters, metallic powders, and the like may also be added to produce special effects for certain purposes.

The functions of these various ingredients in the coating lacquer are as follows:

The ethyl cellulose is the principal film forming material and is mainly responsible for the toughness, flexibility, and heat sealing properties of the film. The ethyl cellulose also has a definite hardening effect upon the waxes and resins, and contributes greatly to the good surface slip and non-blocking properties of the coating. By imparting cohesive strength to the film, the ethyl cellulose also gives the coating scuff-resistance and greatly improves the resistance to smearing. The thermoplastic properties of the ethyl cellulose and its toughening action on the resins and waxes account for the excellent heat sealing properties of these coatings.

The spermaceti imparts moistureproofness to the film, and also exerts a plasticizing action, contributing to the flexibility and heat sealing properties. Paraffin, in the limited range of compositions already mentioned, imparts moistureproofness, and also contributes some plasticizing effect, but both in moistureproofness and plasticizing action it is less effective than spermaceti. When used in addition to spermaceti, paraffin improves the surface slip, and to some extent also, the working properties on automatic wrapping machines.

The hard wax and resin are mainly responsible for the gloss of these coatings; and they also function as blending agents for the other ingredients, thereby preventing "blush" or haziness which would impair the transparency of the film.

The proportions of these solid or film forming ingredients can be varied over a considerable range as is shown by the table below which gives the preferred and operative ranges by weight of the several solid ingredients.

|  | Range of compositions | |
| --- | --- | --- |
|  | Preferred range | Operative range |
|  | Per cent | Per cent |
| Hard wax | 0–40 | 0–70 |
| Resin | 0–50 | 0–70 |
| Spermaceti | 10–30 | 3–45 |
| Paraffin | 0–20 | 0–30 |
| Ethyl cellulose | 20–40 | 10–80 |

The figures in the above table give the percentage by weight of the total solids or total forming materials for each of the several solid ingredients.

These various solid ingredients must be dissolved in a suitable mixture of organic solvents to form a coating solution or lacquer. The solvent mixture must be one in which all the ingredients are mutually soluble, either at room temperature or at temperatures up to 115 degrees F. or slightly higher. As has already been stated, the hard waxes are as a rule difficultly soluble at room temperature, and usually require a slightly elevated temperature to hold them in solution and to prevent clouding or gelation from occurring. The solvent mixture must be so balanced also, that it holds all the ingredients in solution throughout the drying process or until the solid film is set. Because of the high wax contents of these lacquers, it is desirable to have a high proportion of hydro-carbon or wax solvent in the solvent mixture.

These requirements can be met by a number of solvent mixtures, but we prefer to use a mixture of 80% toluene and 20% alcohol by weight. However, other solvent mixtures can also be used, such as the following, which have also been found to be satisfactory: 70% toluene, 20% ethyl acetate, 10% alcohol; 80% benzene, 20% alcohol; 70% benzene, 20% ethyl acetate, 10% alcohol; 80% ethylene dichloride, 20% alcohol; all these percentages being by weight.

The ratio of solids to solvent can be varied over fairly wide limits and will be determined largely by the viscosity at which the coating can be applied, which in turn is dependent upon the particular type of coating mechanism used. Ordinarily, it is desirable to coat the lacquer at the highest solids content compatible with a satisfactory coating viscosity, for this reduces both the solvent costs and the amount of solvents to be dried or evaporated for any given weight of coating solids. Where solvent recovery equipment is installed, the matter of solvent costs is less serious, and under these conditions, a lower solids lacquer of lower viscosity and better flowability and leveling properties may be preferred. Since the ethyl cellulose content is the main determinant of the viscosity, the coating viscosity at any given solids content will depend largely on the concentration of this ingredient. With these factors in mind, the total solids will ordinarily range from 20–40%, although in some instances a higher or lower solids content may be preferred.

In order to more completely describe this invention, we will now give some illustrative examples without in any way limiting ourselves thereby.

*Example 1*

|  | Solution or lacquer composition | Total solids—40% solids composition |
| --- | --- | --- |
|  | Per cent | Per cent |
| Opal wax | 12.0 | 30.0 |
| Hydrogenated ester gum | 8.0 | 20.0 |
| Spermaceti | 8.0 | 20.0 |
| Ethyl cellulose (low viscosity) | 12.0 | 30.0 |
| Toluene | 48.0 |  |
| Alcohol | 12.0 |  |
|  | 100.0 | 100.0 |

Cloud or gelation point; 105 degrees F.

*Example 2*

|  | Solution or lacquer composition | Total solids—40% solids composition |
| --- | --- | --- |
|  | Per cent | Per cent |
| Glyco wax B430 | 6.0 | 15.0 |
| Hydrongenated ester gum | 12.0 | 30.0 |
| Spermaceti | 8.0 | 20.0 |
| Ethyl cellulose (low viscosity) | 14.0 | 35.0 |
| Toluene | 48.0 |  |
| Alcohol | 12.0 |  |
|  | 100.0 | 100.0 |

Cloud or gelation point: 114 degrees F.

*Example 3*

|  | Solution or lacquer composition | Total solids—40% solids composition |
| --- | --- | --- |
|  | Per cent | Per cent |
| I. G. wax S | 6.0 | 15.0 |
| Hydrogenated ester gum | 12.0 | 30.0 |
| Spermaceti | 8.0 | 20.0 |
| Ethyl cellulose (low viscosity) | 14.0 | 35.0 |
| Toluene | 48.0 |  |
| Alcohol | 12.0 |  |
|  | 100.0 | 100.0 |

Cloud or gelation point: 113 degrees F.

*Example 4*

|  | Solution or lacquer composition | Total solids—40% solids composition |
| --- | --- | --- |
|  | Per cent | Per cent |
| Opal wax | 18.0 | 45.0 |
| Spermaceti | 8.0 | 20.0 |
| Ethyl cellulose (low viscosity) | 14.0 | 35.0 |
| Toluene | 48.0 |  |
| Alcohol | 12.0 |  |
|  | 100.0 | 100.0 |

Cloud or gelation point: 107 degrees F.

*Example 5*

|  | Solution or lacquer composition | Total solids—40% solids composition |
| --- | --- | --- |
|  | Per cent | Per cent |
| Hydrogenated ester gum | 16.0 | 40.0 |
| Spermaceti | 8.0 | 20.0 |
| Ethyl cellulose (low viscosity) | 16.0 | 40.0 |
| Toluene | 48.0 |  |
| Alcohol | 12.0 |  |
|  | 100.0 | 100.0 |

Cloud point: below 70 degrees F.

Example 6

| | Solution or lacquer composition | Total solids—40% solids composition |
|---|---|---|
| | Per cent | Per cent |
| Hydrogenated ester gum | 18.0 | 45.0 |
| Asiatic paraffin (M. P. 145° F.) | 6.0 | 15.0 |
| Ethyl cellulose (low viscosity) | 16.0 | 40.0 |
| Toluene | 48.0 | |
| Alcohol | 12.0 | |
| | 100.0 | 100.0 |

Cloud point: 100 degrees F.

Example 7

| | Solution or lacquer composition | Total solids—40% solids composition |
|---|---|---|
| | Per cent | Per cent |
| Opal wax | 6.0 | 15.0 |
| Ester gum | 12.0 | 30.0 |
| Spermaceti | 8.0 | 20.0 |
| Paraffin (M. P. 130° F.) | 2.0 | 5.0 |
| Ethyl cellulose (low viscosity) | 12.0 | 30.0 |
| Toluene | 48.0 | |
| Alcohol | 12.0 | |

Cloud or gelation point: 94 degrees F.

Example 8

| | Solution or lacquer composition | Total solids—40% solids composition |
|---|---|---|
| | Per cent | Per cent |
| Carnauba wax | 6.0 | 15.0 |
| Hydrogenated ester gum | 12.0 | 30.0 |
| Spermaceti | 8.0 | 20.0 |
| Paraffin (M. P. 135° F.) | 2.0 | 5.0 |
| Ethyl cellulose (low viscosity) | 12.0 | 30.0 |
| Toluene | 48.0 | |
| Alcohol | 12.0 | |
| | 100.0 | 100.0 |

Cloud or gelation point: 112 degrees F.

Example 9

| | Solution or lacquer composition | Total solids—25% solids composition |
|---|---|---|
| | Per cent | Per cent |
| Spermaceti | 5.0 | 20.0 |
| Ethyl cellulose (low viscosity) | 20.0 | 80.0 |
| Toluene | 60.0 | |
| Alcohol | 15.0 | |
| | 100.0 | 100.0 |

Cloud point: below 70 degrees F.

These lacquers, thinned if necessary, with a mixture of 80% toluene and 20% alcohol, are warmed to a temperature slightly above their cloud or gelation points, coated on one or both sides of glassine, paper, "Cellophane" or other opaque or transparent sheet material, dried, humidified, and chilled as has been set forth, to produce coatings which are moistureproof and heat-sealable, and except for Example 9, also highly glossy, transparent, hard, tough, flexible, non-tacky, non-blocking, non-smearing, and of good surface slip. The coating of Example 9 is similar to the others in all these properties, except that its gloss and transparency are not as good.

The coating weight will depend on the type of base sheet being coated. On glassine, for example, a coating weight of 1.0 to 2.5 lbs. of lacquer solids per side per ream gives very satisfactory results. On "Cellophane" somewhat less coating can be used and equally good moistureproofness and heat-sealability obtained. In general, the denser, more impervious, and smoother the base sheet, the better the moistureproofness, heat-sealability, and gloss for a given weight of coating, or the less the coating weight needed for a given degree of moistureproofness, heat-sealability, and gloss. For this reason, in the interests of economy, when paper is the base sheet being coated, it is desirable to use supercalendered, smooth, dense stocks. On less dense sheets than glassine, or on glassine also for certain purposes, coating weights up to 5.0 lbs. per side per ream or even higher may be used.

In some cases, however, these solutions may be used to impregnate and transparentize paper, rather than simply as a surface coating. In these cases, the object is complete saturation of the base sheet, in order to displace all the air and completely fill the voids with a material which is closer in refractive index to the cellulose than the air displaced. The more completely the air is displaced and the voids filled, and the closer the refractive index of the impregnating medium to that of cellulose (refractive index of cellulose is 1.53, that of air is 1.00), the greater will be the transparentizing effect obtained. Surface smoothness is also a factor, for this also has a bearing on whether the light will be directly transmitted or scattered.

In this case a paper is required which is not as impervious as glassine, but not necessarily too highly porous either. Super calendered sulfite stocks, such as are used to produce transparent papers of the wax saturated type, are quite suitable. These papers should be free of any opaque (that is, high refractive index) sizing or filling materials.

These papers can be impregnated with the coating solutions of this invention in various ways. Thus, the paper can be dipped into the coating solution heated somewhat above its cloud or gelation point, and left immersed long enough for complete saturation to occur. The excess coating can be then wiped off, and the coated and impregnated paper dried, humidified, and chilled as has already been set forth. This method can be made to give satisfactory results, but the time of immersion required for good saturation is often such that the coating speed is impracticably slow for commercial use, or a lacquer bath of impracticably great length is required for a continuous coating operation.

These difficulties can be avoided by the following method, which is the one we prefer. In this method, an excess of the warm lacquer is applied to the paper, and the paper wound up without drying the lacquer. The roll coated with an excess of wet lacquer is then placed in a warm room, the temperature of which should be substantially above the cloud or gelation point of the lacquer, and left long enough (1 or 2 hours or even longer if necessary) for good saturation of the paper by the lacquer to occur. At temperatures up to 130 degrees F. solvent evaporation is not very rapid from these high wax content lacquers, so that the lacquer will not dry, particularly with the paper wound up in a roll, but if necessary, the roll can be stored in a closed metal container, which will impede solvent evaporation still further. When saturation is complete, the paper is run through the coating machine a second time, the excess lacquer removed, the surface of the coating smoother, and the coated and impregnated paper dried, humidified, and chilled as has already been set forth. In this way, coated and impregnated papers can be obtained that are highly glossy and transparent, and which are also moistureproof, heat sealable, flexible, of good surface slip, non-smearing, non-blocking, and of greatly improved wet strength. For best transparency, light weight tissues, whose basic weight or ream weight is less than 20 lbs. are preferred, but where strength is the controlling factor, heavier papers up to 30 lbs. ream weight may be used and good results obtained. For impregnating purposes the lacquer viscosity is preferably somewhat lower than when surface coating only is intended.

These compositions can also be used to laminate paper, foil, chipboard, Cellophane, and other sheet materials, to produce a moistureproof, laminated product. For this purpose, the coating is applied, dried, and chilled, and the base sheet humidified, if necessary, in the same manner as has already been set forth. In laminating both surfaces to be joined may be coated, which is preferable for the best bond, or the adhesive coating may be applied to only one of the two sheets being combined. Likewise, the coating and combining can be done as a single operation, or the base sheets to be combined may be coated first, dried, and wound-up, and the combining done in a subsequent operation. In either case, after the coating has been applied and dried, the coated surfaces are brought together and the sheets are joined or bonded together by proper application of heat and pressure. This can be done by rolls heated to a temperature of 250–450° F., after which the laminated sheet is preferably chilled to set the adhesive coating and improve its transparency.

With particular reference to waxed or lacquered glassine used to wrap articles high in moisture content such as bread, it frequently happens that the glassine swells, wrinkles, or cockles, and in extreme cases even becomes quite soggy, the coatings lose their gloss and the whole sheet becomes clouded and hazy. This is due to the sensitivity of this type of paper to moisture and to the fact that when both sides of the sheet are coated with films of about the same moistureproofness, moisture gets trapped within the sheet and causes the undesirable effects just mentioned.

We have found that this swelling, wrinkling, cockling, sogginess, loss of gloss, and haziness can be entirely overcome if the coated glassine, used to wrap an article high in moisture such as bread, is coated on its outside surface with a coating that is definitely less moistureproof than the one used on the inside surface; by inside surface we mean the surface that is next to the article being wrapped. When this condition prevails, moisture can leave the paper through the outside surface faster than it enters through the inside surface, no moisture accumulates within the sheet, and the adverse effects mentioned due to trapped moisture are eliminated. In order to function properly in preventing moisture from accumulating within the glassine sheet, the coating on the outside surface should have two or more times the moisture vapor permeability of the coating on the inside. In such a case, most of the moistureproofness comes from the inside coating, and the outside coating serves mainly to enhance the gloss and transparency and to provide heat sealing properties. The coating compositions we have disclosed, however, are so moistureproof that, even when applied to only the inside surface, the overall moistureproofness is adequate for most purposes.

Thus, when glassine is the sheet being coated, it may be preferable for many uses to coat the outside surface with a less moistureproof coating than those so far disclosed, which in such cases would be used only on the inside surface.

Thus, for coating the outside surface we may use a nitrocellulose lacquer, such as du Pont #6325 or #6311 heat-sealing lacquers, (manufactured by E. I. du Pont de Nemours & Co., Parlin, N. J.) which can be made moistureproof by the addition of 2–6% paraffin wax based on their solids content. For the purpose here employed, we may use less than 2% wax based on the solids content or no wax at all, so as to reduce the moistureproofness well below that of the inside coating. By thus varying the wax content or by substituting other waxes for the paraffin, such as Opal wax, candelilla, and Nopco Wax A (Nopco Wax A is a synthetic wax manufactured by the National Oil Products Co., Harrison, N. J.) the moisture permeability value can be made 2, 20, 50, 100 or more times that of the inside coating.

Or for use on the outside surface, we may prefer to use a molten coating composition, such as that disclosed in a copending patent application, Serial No. 319,684 filed February 19, 1940. For this particular use, we would choose a molten coating composition which was heat-sealable but of relatively high moisture permeability value. This moisture permeability value should be at least twice that of the inside coating, and preferably even more permeable, up to 10, 20, 50, or even 100 or more times as permeable as the inside coating.

Of for use on the outside surface, we might use coating compositions formulated according to the teachings of this invention except that the spermaceti is simply omitted, or another wax, such as beeswax, bleached montan wax, Japan wax, or a petroleum micro-crystalline or amorphous wax is used in its place.

As examples of such compositions, which are heat sealing, glossy, transparent, hard, tough, flexible, non-tacky, non-blocking, of good surface slip, and resistant to smearing, but not moistureproof, and therefore well suited for use on the outside surface of a glassine sheet designed for wrapping a moist product, such as bread, we give the following:

*Example 10*

|  | Solution or lacquer composition | Total solids—40% solids composition |
|---|---|---|
|  | Per cent | Per cent |
| Hydrogenated ester gum | 16.0 | 40 |
| Refined bleached beeswax | 8.0 | 20 |
| Ethyl cellulose (low viscosity) | 10.0 | 40 |
| Toluene | 48.0 |  |
| Alcohol | 12.0 |  |
|  | 100.0 | 100 |

Cloud or gelation point: 100 degrees F.

Example 11

|  | Solution or lacquer composition | Total solids—40% solids composition |
|---|---|---|
|  | Per cent | Per cent |
| Candelilla wax | 6.0 | 15 |
| Hydrogenated ester gum | 12.0 | 30 |
| Refined bleached beeswax | 4.0 | 10 |
| Bleached montan wax | 4.0 | 10 |
| Ethyl cellulose (low viscosity) | 14.0 | 35 |
| Toluene | 48.0 |  |
| Alcohol | 12.0 |  |
|  | 100.0 | 100 |

Cloud or gelation point: 98 degrees F.

Example 12

|  | Solution or lacquer composition | Total solids—40% solids composition |
|---|---|---|
|  | Per cent | Per cent |
| Opal wax | 8.0 | 20 |
| Hydrogenated ester gum | 16.0 | 40 |
| Ethyl cellulose | 16.0 | 40 |
| Toluene | 48.0 |  |
| Alcohol | 12.0 |  |
|  | 100.0 | 100 |

Cloud or gelation point: 97 degrees F.

Glassine, coated on one side with the moistureproofing and heat-sealing composition, such as are illustrated in Examples 1–9, is then coated on the other side with heat sealing but relatively non-moistureproof coatings, such as are illustrated in Examples 10–12. Or the non-moistureproof but heat-sealing coatings may be applied first, and the moistureproofing and heat-sealing coatings applied last, for the order of coating is immaterial. In both cases, the lacquers are warmed slightly above their cloud or gelation points, coated on the paper, dried, humidified, and chilled as has already been set forth.

In accordance with the patent statutes we have described the principles of construction and the methods of application of our high wax content, moistureproofing and heat-sealing ethyl cellulose lacquers on base sheets, and while we have endeavored to set forth the best embodiments thereof, we desire to have it understood that this is only illustrative of a means of carrying out our invention, and that obvious changes may be made within the scope of the following claims without departing from the spirit of our invention.

We claim:

1. A method of preparing transparent moistureproof materials which comprises impregnating a base sheet with a composition comprising from 20% to 40% of a cellulose ether and at least substantially 20% of spermaceti, dissolved in a suitable mixture of organic solvents and applied to the sheet, evaporating the solvents at an elevated temperature, chilling the impregnated sheet, and humidifying the sheet.

2. A method of preparing transparent moistureproof materials which comprises impregnating a base sheet with a composition comprising from 20% to 40% of a cellulose ether, resin, and at least substantially 20% of spermaceti dissolved in a suitable mixture of organic solvents and applied to the sheet, evaporating the solvents at an elevated temperature, chilling the impregnated sheet, and humidifying the sheet.

3. A method of preparing transparent moistureproof materials which comprises impregnating a base sheet with a composition comprising from 20% to 40% of a cellulose ether, hard wax, and spermaceti dissolved in a suitable mixture of organic solvents and applied to the sheet, the total wax content being from 20% to 60% of the total solids, evaporating the solvents at an elevated temperature, chilling the impregnated sheet, and humidifying the sheet.

4. A method of preparing transparent moistureproof materials which comprises impregnating a base sheet with a composition comprising from 20% to 40% of a cellulose ether, resin, hard wax, and spermaceti dissolved in a suitable mixture of organic solvents and applied to the sheet, the total wax content being from 20% to 60% of the total solids, evaporating the solvents at an elevated temperature, chilling the impregnated sheet, and humidifying the sheet.

5. A method of preparing transparent moistureproof materials which comprises impregnating a thin paper sheet with an excess of a coating solution comprising from 20% to 40% of a cellulose ether, resin, and spermaceti dissolved in a suitable mixture of organic solvents, winding the impregnated paper while wet, storing the wound paper in a heated room for a sufficient time to allow the solution to saturate the paper, simultaneously impeding evaporation of the solvent, removing the excess lacquer, smoothing the coating, drying the paper, chilling the same, and humidifying the sheet to produce a moistureproof and heat sealable sheet, which is also glossy, transparent, non-tacky, flexible, and resistant to smearing.

6. A method of preparing transparent moistureproof materials which comprises impregnating a thin paper sheet with an excess of a coating solution comprising from 20% to 40% of a cellulose ether, hard wax, and spermaceti dissolved in a suitable mixture of organic solvents, the total wax content being from 20% to 60% of the total solids, winding the impregnated paper while wet, storing the wound paper in a heated room for a sufficient time to allow the solution to saturate the paper, simultaneously impeding evaporation of the solvent, removing the excess lacquer, smoothing the coating, drying the paper, chilling the same, and humidifying the sheet to produce a moistureproof and heat sealable sheet, which is also glossy, transparent, non-tacky, flexible, and resistant to smearing.

7. A method of preparing transparent moistureproof materials which comprises impregnating a thin paper sheet with an excess of a coating solution comprising from 20% to 40% of a cellulose ether, hard wax, resin, and spermaceti dissolved in a suitable mixture of organic solvents, the total wax content being from 20% to 60% of the total solids, winding the impregnated paper while wet, storing the wound paper in a heated room for a sufficient time to allow the solution to saturate the paper, removing the excess lacquer, simultaneously impeding evaporation of the solvent, smoothing the coating, drying the paper, chilling the same, and humidifying the sheet to produce a moistureproof and heat sealable sheet, which is also glossy, transparent, non-tacky, flexible, and resistant to smearing.

8. An article of manufacture suitable for wrapping a product high in moisture content comprising a paper having on one surface a coating comprising from 20% to 40% of a cellulose ether, resin, and at least substantially 20% of spermaceti, and having on its other surface a coating comprising a composition less moistureproof but heat sealable.

9. An article of manufacture suitable for wrapping a product high in moisture content comprising a paper having on one surface a coating comprising from 20% to 40% of a cellulose ether, resin, and at least substantially 20% of spermaceti, and having on its other surface a coating comprising a composition less moistureproof but heat sealable, comprising a cellulose ether, resin, and wax.

10. An article of manufacture suitable for wrapping a product high in moisture content comprising a paper having on one surface a coating comprising from 20% to 40% of a cellulose ether, hard wax and spermaceti, the total wax content comprising from 20% to 60% of said coating, and having on its other surface a coating comprising a composition less moistureproof but heat sealable.

11. An article of manufacture suitable for wrapping a product high in moisture content comprising a paper having on one surface a coating comprising from 20% to 40% of a cellulose ether, hard wax and spermaceti, the total wax content comprising from 20% to 60% of said coating; and having on its other surface a coating less moistureproof but heat sealable comprising a cellulose ether, resin, and wax.

12. An article of manufacture suitable for wrapping a product high in moisture content comprising a paper having on one surface a coating comprising from 20% to 40% of a cellulose ether, hard wax, resin, and spermaceti, the total wax content comprising from 20% to 60% of said coating; and having on its other surface a coating comprising a composition less moistureproof but heat sealable.

13. An article of manufacture suitable for wrapping a product high in moisture content comprising a paper having on one surface a coating comprising from 20% to 40% of a cellulose ether, hard wax, resin, and spermaceti, the total wax content comprising from 20% to 60% of said coating; and having on its other surface a coating less moistureproof but heat sealable comprising a cellulose ether, resin, and wax.

14. A method of preparing transparent moistureproof materials which comprises humidifying a base sheet to embody therein an excess of moisture, impregnating the base sheet with a composition comprising from 20% to 40% of a cellulose ether and at least 20% of spermaceti dissolved in a suitable mixture of organic solvents and applied to the sheet, evaporating the solvents at an elevated temperature and chilling the impregnated sheet.

15. A method of preparing transparent moistureproof materials which comprises impregnating one surface of a base sheet with a composition comprising from 20% to 40% of a cellulose ether, and at least substantially 20% of spermaceti dissolved in a suitable mixture of organic solvents and applied to the sheet, evaporating the solvents at an elevated temperature, chilling the impregnated sheet, humidifying the sheet through the uncoated side thereof to provide an excess of moisture in the sheet and coating the remaining surface of the sheet.

16. An article of manufacture comprising a base sheet coated with a coating comprising from 20% to 40% of a cellulose ether, resin, and at least substantially 20% of spermaceti.

17. An article of manufacture comprising a base sheet coated with a coating comprising from 20% to 40% of a cellulose ether, a hard wax, and spermaceti, the total wax content comprising from 20% to 40% of said coating.

JOHN P. SERMATTEI.
CECIL M. RHODES.